United States Patent
Hatano et al.

(10) Patent No.: US 7,886,526 B2
(45) Date of Patent: Feb. 15, 2011

(54) FUEL CONTROL OF AN INTERNAL-COMBUSTION ENGINE

(75) Inventors: Junichi Hatano, Saitama (JP); Katsuji Wada, Saitama (JP); Takashi Konomoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 529 days.

(21) Appl. No.: 12/038,312

(22) Filed: Feb. 27, 2008

(65) Prior Publication Data

US 2008/0202099 A1    Aug. 28, 2008

(30) Foreign Application Priority Data

Feb. 28, 2007    (JP) .............................. 2007-049987

(51) Int. Cl.
*F01N 3/00*    (2006.01)
(52) U.S. Cl. .............................. 60/286; 60/274; 60/285; 60/299; 60/303; 123/305
(58) Field of Classification Search ............... 60/274, 60/285, 286, 295, 299, 303; 123/299, 305
See application file for complete search history.

(56) References Cited

U.S. PATENT DOCUMENTS

| | | | |
|---|---|---|---|
| 6,173,570 B1 * | 1/2001 | Mitsumoto et al. ............ 60/285 |
| 6,574,956 B1 * | 6/2003 | Moraal et al. ................. 60/295 |
| 7,121,083 B2 * | 10/2006 | Ishibashi et al. .............. 60/285 |
| 7,159,389 B2 * | 1/2007 | Miura .......................... 60/295 |
| 7,281,368 B2 * | 10/2007 | Miyake et al. ................ 60/285 |
| 7,677,223 B2 * | 3/2010 | Okazaki et al. ............. 123/434 |

FOREIGN PATENT DOCUMENTS

JP    2003-322015    11/2003

* cited by examiner

*Primary Examiner*—Binh Q Tran
(74) *Attorney, Agent, or Firm*—Arent Fox LLP (57) ABSTRACT

The present invention provides a fuel control for an internal-combustion engine having an exhaust gas purifying device that is disposed in an exhaust system of the engine. A reducing agent is supplied to the exhaust gas purifying device by injecting fuel in an expansion stroke or an exhaust stroke of the engine. An intake air amount supplied to the engine is controllable. The fuel control includes decreasing the intake air amount supplied to the engine during the fuel injection for the supply of the reducing agent. The fuel control also includes advancing an injection timing of the fuel injection for the supply of the reducing agent when an actual intake air amount is less than a desired intake air amount or when an actual boost pressure is higher than a desired boost pressure. The advancement of the injection timing improves the combustibility of engine while decreasing the HC exhaust amount.

9 Claims, 7 Drawing Sheets

FUEL CONTROL OF AN INTERNAL-COMBUSTION ENGINE

BACKGROUND OF THE INVENTION

The present invention relates to a control of fuel to be supplied to an internal-combustion engine.

Conventionally, in order to regenerate an exhaust gas purifying device provided in an exhaust system of an engine, an air/fuel ratio is switched from lean to rich at a predetermined timing. Japanese Patent Application Publication No. 2003-322015 discloses a technique for performing a post-injection of a small amount of fuel after a main injection so as to reduce NOx trapped in a NOx trapping catalyst disposed in an exhaust system of an engine. According to this technique, a fuel amount to be injected in the post-injection and its injection timing are determined based on a delay of an actual value with respect to a desired value for the intake air amount.

The post-injection is capable to enrich the air/fuel ratio to reduce NOx without any torque variation. However, if such a post-injection is performed under a state of air shortage, the amount of unburned fuel to be exhausted, that is, the exhaust amount of HC (hydrocarbon) may increase because the post-injection is performed in an expansion stroke or an exhaust stroke.

Considering these problems, the present invention aims at suppressing an increase of the HC exhaust amount even when an injection for reducing an exhaust gas purifying device is performed under a state of air shortage.

SUMMARY OF THE INVENTION

According to one aspect of the invention, a fuel control for an engine is provided. The engine has an exhaust gas purifying device that is disposed in an exhaust system of the engine. A reducing agent is supplied to the exhaust gas purifying device by injecting fuel in an expansion stroke or an exhaust stroke of the engine. An intake air amount supplied to the engine is controllable. The fuel control includes decreasing the intake air amount supplied to the engine during the fuel injection for the supply of the reducing agent. The fuel control also includes advancing an injection timing of the fuel injection for the supply of the reducing agent when an actual intake air amount is less than a desired intake air amount or when an actual boost pressure is higher than a desired boost pressure.

When an actual intake air amount is less than a desired intake air amount or when an actual boost pressure is higher than a desired boost pressure by decreasing the intake air amount, there may occur a shortage of the amount of air with respect to the amount of fuel, which may cause an increase in the unburned fuel and eventually an increase in the HC exhaust amount. According to this invention, in such a situation, the injection timing of the fuel injection performed for the reduction is advanced. Therefore, an atmosphere where the temperature and the pressure inside a cylinder are high is created to improve the ignitability, which can more surely burn the fuel injected for the reduction. Thus, an increase in the HC exhaust amount due to the unburned fuel can be suppressed. Further, according to this invention, because the combustibility of the fuel injected for the reduction is improved, a supply of CO (carbon monoxide) required as a reducing agent of a catalyst that traps NOx (nitrogen oxides) can be secured while suppressing an increase in the HC exhaust amount. Because the amount of fuel injection required for supplying the equivalent amount of CO can be decreased, the fuel efficiency can be improved.

According to one embodiment of the present invention, the fuel control further includes setting a limit on an amount of the advancement of the injection timing of the fuel injection for the supply of the reducing agent. Thus, because the advance angle amount of the injection timing is limited, occurrence of smoke can be restricted to an allowable level.

According to one embodiment of the present invention, an amount of the advancement of the injection timing is determined by adding an advance angle amount determined based on a difference between the actual intake air amount and the desired intake air amount and an advance angle amount determined based on a difference between the actual boost pressure and the desired boost pressure. Thus, the injection timing can be determined such that an increase in the HC exhaust amount is suppressed in terms of both of the intake air amount and the boost pressure.

DESCRIPTION OF THE PREFERRED EMBODIMENTS

Figure 1:
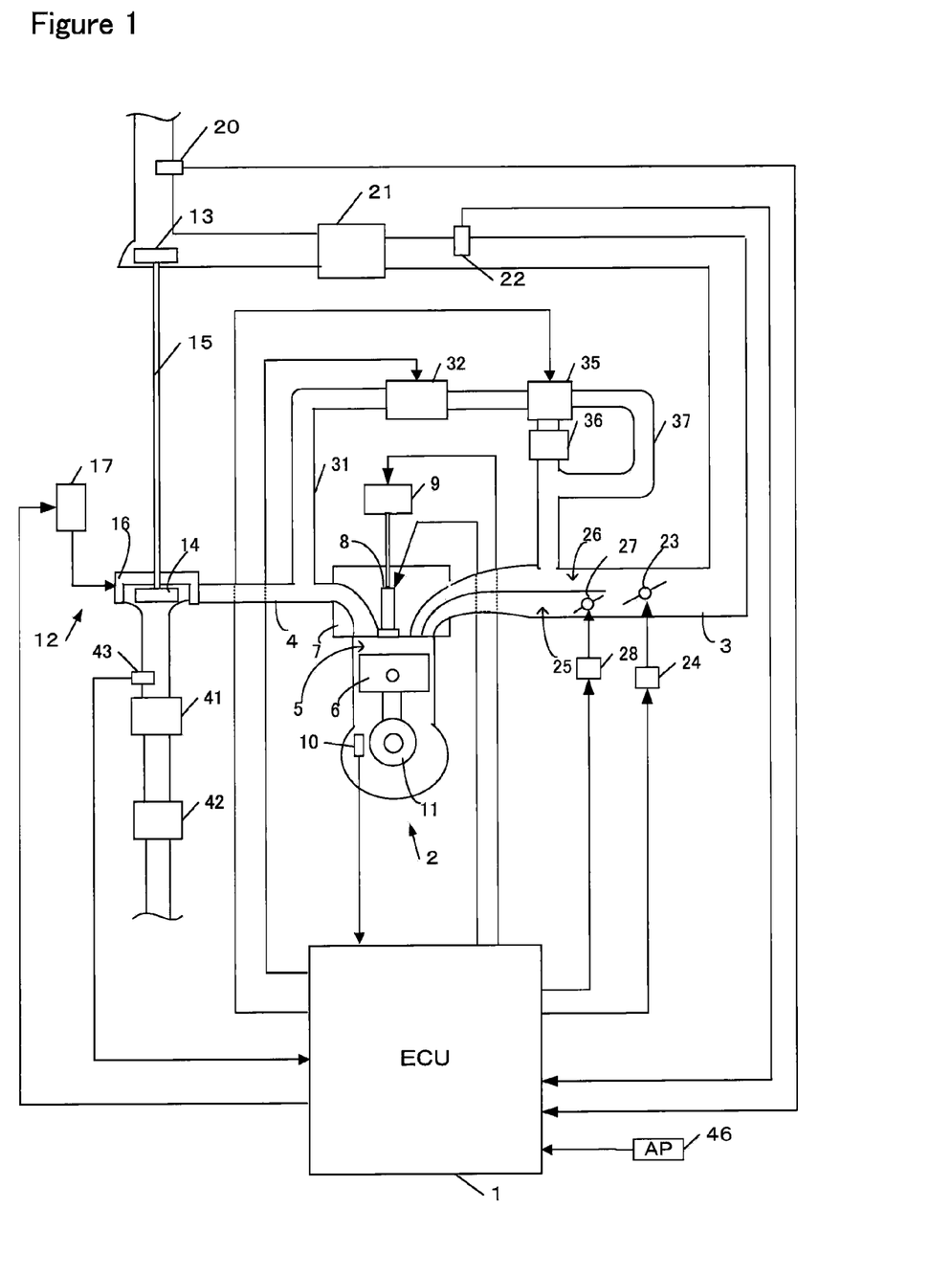
FIG. 1 is a block diagram showing an engine and its control unit in accordance with one embodiment of the present invention.

Preferred embodiments of the present invention will be described referring to the attached drawings. FIG. 1 is an overall system structure of an internal-combustion engine (which will be hereinafter referred to as an "engine") and its control unit in accordance with one embodiment of the present invention.

An electronic control unit (hereinafter referred to as an "ECU") 1 is a computer having a central processing unit (CPU) and a memory. The memory can store one or more computer programs for implementing various controls for a vehicle and data required for executing the programs. The ECU 1 receives data sent from each section of the vehicle and performs operations using the received data to generate control signals for controlling each section of the vehicle.

In this embodiment, an engine 2 is a diesel engine. The engine 2 comprises, for example, four cylinders. One of the cylinders is illustrated in FIG. 1.

An intake manifold 3 and an exhaust manifold 4 are connected to the engine 2. A combustion chamber 5 is formed between a piston 6 and a cylinder head 7. A fuel injection valve 8 is attached in such a manner as to protrude into the combustion chamber 5. The fuel injection valve 8 is connected to a high pressure pump 9 and a fuel tank (not shown in the figure) via a common rail (not shown in the figure). The high pressure pump 9 raises a pressure of fuel in the fuel tank and then sends the fuel to the fuel injection valve 8 via the common rail. The fuel injection valve 8 injects the received fuel into the combustion chamber 5. An injection pressure of the fuel (which is referred to as a "fuel pressure") can be changed by controlling the high pressure pump 9 through a control signal from the ECU 1. The fuel pressure is detected by a fuel pressure sensor that is disposed in the common rail. Its detection signal is sent to the ECU 1. Further, an injection time period (or injection amount) and an injection timing of the fuel injection valve 8 are controlled in accordance with a control signal from the ECU 1.

A crank angle sensor 10 is provided in the engine 2. The crank angle sensor 10 outputs a CRK signal and a TDC signal in accordance with the rotation of a crank shaft 11 to the ECU 1. The CRK signal is a pulse signal to be output at every predetermined crank angle. In response to the CRK signal, the ECU 1 calculates a rotational speed NE of the engine 2. The TDC signal is a pulse signal to be output at a crank angle associated with a top dead center (TDC) position of the piston 6 at a start time of the intake stroke. In case of the 4-cylinder engine, the TDC signal is output at every 180 degrees of the crank angle.

A supercharger 12 is provided. The supercharger 12 has a rotatable compressor 13 disposed in the intake manifold, a rotatable turbine 14 disposed in the exhaust manifold 4 and a shaft 15 connecting the compressor 13 and the turbine 14. The turbine 14 is driven to rotate by the kinetic energy of the exhaust gas. The rotational movement of the turbine 14 drives the compressor 13 to rotate to compress the intake air.

The turbine 14 has a plurality of rotatable variable vanes 16 (only two vanes are shown in the figure). An actuator 17 is connected to each of the variable vanes 16. The actuator 17 changes the opening degree of the variable vane 16 (which is referred to as a "vane opening degree") in accordance with a control signal from the ECU 1. By changing the vane opening degree, the rotational speed of the turbine 14 can be changed. As the vane opening degree is smaller, the rotational speed of the turbine 14 is greater and hence the boost pressure increases.

In the intake manifold 3, an air flow sensor 20 is disposed upstream of the compressor 13, and a water-cooled intercooler 21 and a boost pressure sensor 22 are disposed downstream of the compressor 13. The air flow sensor 20 detects an amount of intake air introduced into the intake manifold 3. The boost pressure sensor 22 detects a pressure (boost pressure) inside of the intake manifold 3. These detection signals are sent to the ECU 10. The intercooler 21 operates to cool down the intake air when, for example, a temperature of the intake air rises due to the boost operation by the supercharger 12.

A throttle valve 23 is disposed downstream of the boost pressure sensor 22. An actuator 24 is connected to the throttle valve 23 to control the opening degree of the throttle valve 23 in accordance with a control signal from the ECU 1.

In the downstream of the throttle valve 23, the intake manifold branches corresponding to respective cylinders. Each intake manifold branch extends to a combustion chamber of the corresponding cylinder through an intake port. The intake manifold is partitioned into two passages 25, 26. In one passage 25, a swirl valve 27 is provided and connected with an actuator 28, which can change the opening degree of the swirl valve 27 in accordance with a control signal from the ECU 1. The strength of the swirl that occurs in the combustion chamber 5 can be controlled by the opening degree of the swirl valve 27.

An EGR pipe 31 is provided between the intake manifold 3 and the exhaust manifold 4, more specifically, between the passage 26 in a collecting portion for the intake manifold branches and the upstream of the turbine 14 in the exhaust manifold 4. Through the EGR pipe 31, a part of the exhaust gas of the engine 2 is recirculated as an EGR gas. Such recirculation decreases the combustion temperature in the combustion chamber 5 and hence can decrease NOx in the exhaust gas.

An EGR control valve 32 is disposed in the EGR pipe 31. In one example, the EGR control valve 32 is formed by a linear electromagnetic valve so that a lift amount of the EGR control valve 32 can be linearly changed in accordance with a control signal from the EGU 1. According to the lift amount of the EGR control valve 32, an amount of the EGR gas to be recirculated can be controlled (such an amount is referred to as an "EGR amount").

A switching valve 35 and an EGR cooler 36 are disposed in the EGR pipe 31. A passage 37 is a bypass passage for bypassing the EGR cooler 36. The switching valve 35 selectively switches the downstream of the switching valve 35 between the EGR pipe 31 and the bypass passage 37 in accordance with a control signal from the EGU 1. When the bypass passage 37 is selected, the EGR gas is introduced into the bypass passage 37 and then recirculated into the intake manifold 3. When the EGR pipe 31 is selected, the EGR gas is cooled by the EGR cooler 36 and then recirculated into the intake manifold 3.

A three-way catalyst 41 and a NOx catalyst 42 are disposed downstream of the turbine 14 of the exhaust manifold 4. When the air/fuel ratio is a theoretical (stoichiometric) air/fuel ratio, the three-way catalyst 41 oxidizes HC and CO while reducing NOx to purify the exhaust gas. When the air/fuel ratio is lean and the oxygen concentration in the exhaust gas is relatively high, the NOx catalyst 42 captures NOx contained in the exhaust gas. When the air/fuel ratio is rich and the concentration of the reducing agent (HC, CO) in the exhaust gas is relatively high, the NOx catalyst 42 reduces the captured NOx to purify the exhaust gas.

Further, a LAF sensor 43 is disposed upstream of the three-way catalysts 41. The LAF sensor 43 linearly detects an oxygen concentration in the exhaust gas over a wide range of the air-fuel ratio from rich to lean. Based on the oxygen concentration detected by the LAF sensor 43, the ECU 1 calculates an actual air/fuel ratio of an actual air-fuel mixture that has burned in the combustion chamber 5.

An accelerator pedal opening degree sensor 46 is further connected to the ECU 1 to output a detection signal representing an operation amount (which is referred to as an accelerator opening degree) of an accelerator pedal (not shown in the figure).

In response to the above-described input signals and in accordance with one or more programs and data (including one or more maps) stored in the memory, the ECU 1 detects an operating condition of the engine 2 and controls the fuel injection amount, the fuel injection timing, the EGR amount, the intake air amount, the boost pressure and so on.

In a normal operation of the engine 2, the air/fuel ratio is set to a value on the lean side with respect to the theoretical air/fuel ratio. As described above, the NOx catalyst 42 operates to trap NOx contained in the exhaust gas when the air/fuel ratio is lean. Therefore, in order to regenerate this catalyst, it is required to switch the air/fuel ratio to rich at a predetermined timing so as to supply the reducing agent (HC, CO) into the exhaust gas and desorb the trapped NOx from the catalyst.

On the other hand, one combustion cycle consists of an intake stroke for taking air into the combustion chamber 5 from the vicinity of the top dead center (TDC) to the vicinity of the bottom dead center of the piston, a compression stroke for compressing the intake air by the rising piston 6 from the vicinity of the bottom dead center to the vicinity of the top dead center of the piston 6, an expansion stroke for pushing down the piston 6 by the combustion of the air-fuel mixture, and an exhaust stroke for exhausting the gas in the combustion chamber from the vicinity of the bottom dead center to the vicinity of the top dead center of the piston 6. An injection for causing the engine to output a desired torque (such an injection is referred to as a "main injection") is typically performed in the vicinity of the top dead center in the compression stroke. In this embodiment of the present invention, the air/fuel ratio is enriched by an injection performed in the expansion stroke or the exhaust stroke after the main injection (such an injection is referred to as a "post-injection"). The fuel injected through the post-injection supplies the reducing agent (CO, HC) into the exhaust gas, which can reduce the NOx catalyst 42. By using the post-injection, the NOx catalyst 42 can be regenerated while variations in the output torque are suppressed.

Figure 2:
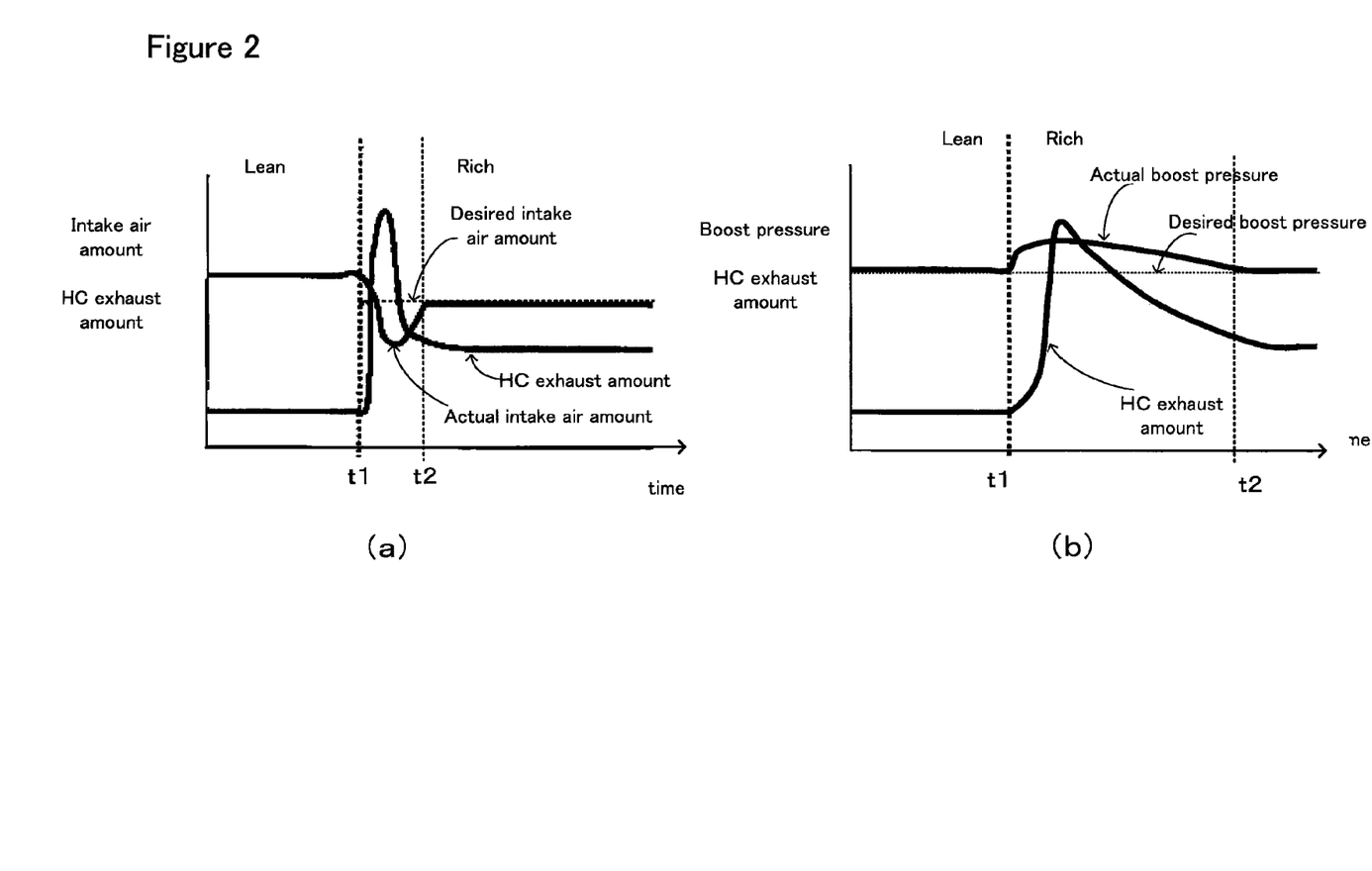
FIG. 2 is a graph showing an increase in an HC exhaust amount caused by an enrichment operation.

FIG. 2(*a*) shows an example of a behavior of an actual intake air amount and an HC exhaust amount in a certain engine operating condition without applying the present invention.

In this example, a fuel injection amount that is injected by the fuel injection valve is feedback-controlled such that the actual air/fuel ratio converges to a desired air/fuel ratio. The EGR amount is also feedback-controlled such that the actual intake air amount converges to a desired intake air amount. The opening degree of the throttle valve and the boost pressure are set to corresponding desired values that are determined based on the engine operating condition.

At time t1, in response to satisfaction of a predetermined enrichment condition, the air/fuel ratio is switched from lean to rich. The enrichment operation is implemented by increasing the fuel by performing the post-injection in addition to the main injection while decreasing the opening degree of the throttle valve to a desired throttle opening.

When the opening degree of the throttle valve is decreased, the amount of air taken into the engine is temporarily and abruptly decreased. Although the feedback control for the EGR amount tries to cause the actual intake air amount to converge to the desired intake air amount, the actual intake air amount may temporarily fall below (undershoot) the desired intake air amount. If such undershooting occurs, a difference temporarily occurs between the desired intake air amount and the actual intake air amount (time t1 through t2). Because the actual intake air amount falls short of the desired intake air amount, the unburned fuel increases and hence the amount of HC that is to be exhausted to the atmosphere temporarily increases as shown in the figure.

Even if such undershooting does not occur, the HC exhaust amount may increase when the opening degree of the throttle valve is decreased at the enrichment operation. In this regard, referring to FIG. 2(*b*), an example of a behavior of an actual boost pressure and an HC exhaust amount in a certain engine operating condition without applying the present invention is shown. Similarly to FIG. 2(*a*), the opening degree of the throttle valve is decreased so as to perform the enrichment operation at time t1.

By decreasing the throttle opening degree, the pressure of air upstream of the throttle valve, which can be detected by the boost pressure sensor 22 of FIG. 1, temporarily rises. As a result, as shown in the figure, the actual boost pressure may exceed (overshoot) a desired boost pressure. Due to such overshooting, a difference occurs between the desired boost pressure and the actual boost pressure (time t1 through t2). The magnitude of the difference reflects the amount of new air that has decreased by narrowing the opening degree of the throttle valve. In order to cause the actual intake air amount to converge to the desired intake air amount, the EGR amount corresponding to the decreased amount of the new air is introduced into the engine. Because a ratio of the EGR amount with respect to the desired intake air amount relatively increases, the unburned fuel increases and hence the amount of HC that is to be exhausted to the atmosphere temporarily increases as shown in FIG. 2(*b*).

Thus, a problem may occur that the HC exhaust amount increases when the opening degree of the throttle valve is made smaller in switching the air/fuel ratio from lean to rich. The present invention suppresses such an increase in the HC exhaust amount by advancing the injection timing of the post-injection. By advancing the post-injection timing, the fuel injected by the post-injection can be burned under a condition where the temperature and the pressure inside of the combustion chamber are high. Therefore, the injected fuel can be more surely burned. As a result, an occurrence of the unburned fuel can be suppressed and hence an increase in the HC exhaust amount can be suppressed.

Figure 3:
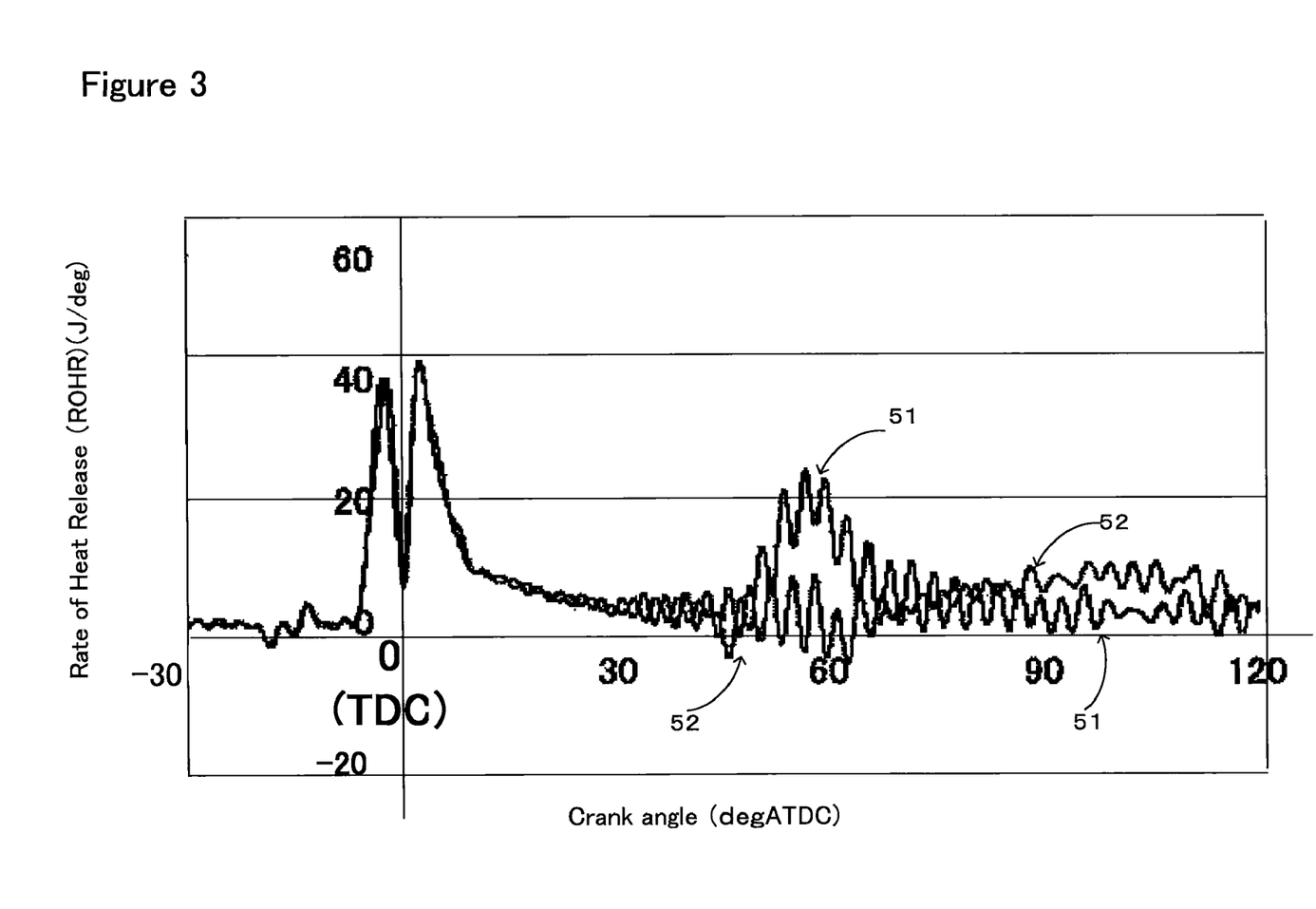
FIG. 3 is a graph for explaining that an HC exhaust amount can be decreased by advancing a post-injection timing.

In this regard, FIG. 3 shows an example of a simulation result of a rate of heat release (ROHR) for different post-injection timings when the actual intake air amount is less than the desired intake air amount. As the value of the ROHR is higher, the fuel is burned more actively. Reference numeral 51 indicates an ROHR in the case where the post-injection timing is 40 degrees after the compression TDC (that is, ATDC 40 degrees). Reference numeral 52 indicates an ROHR in the case where the post-injection timing is 55 degrees after the compression TDC (that is, ATDC 55 degrees). As clearly seen from a comparison of both ROHRs around 60 degrees after the compression TDC, the ROHC when the post-injection timing is 40 degrees after the compression TDC is higher than the ROHC when the post-injection timing is 55 degrees after the compression TDC. That is, the fuel is burned more actively if the post-injection timing is advanced. As the fuel is burned more actively, an occurrence of the unburned fuel is suppressed and hence the HC exhaust amount can be decreased.

Figure 4:
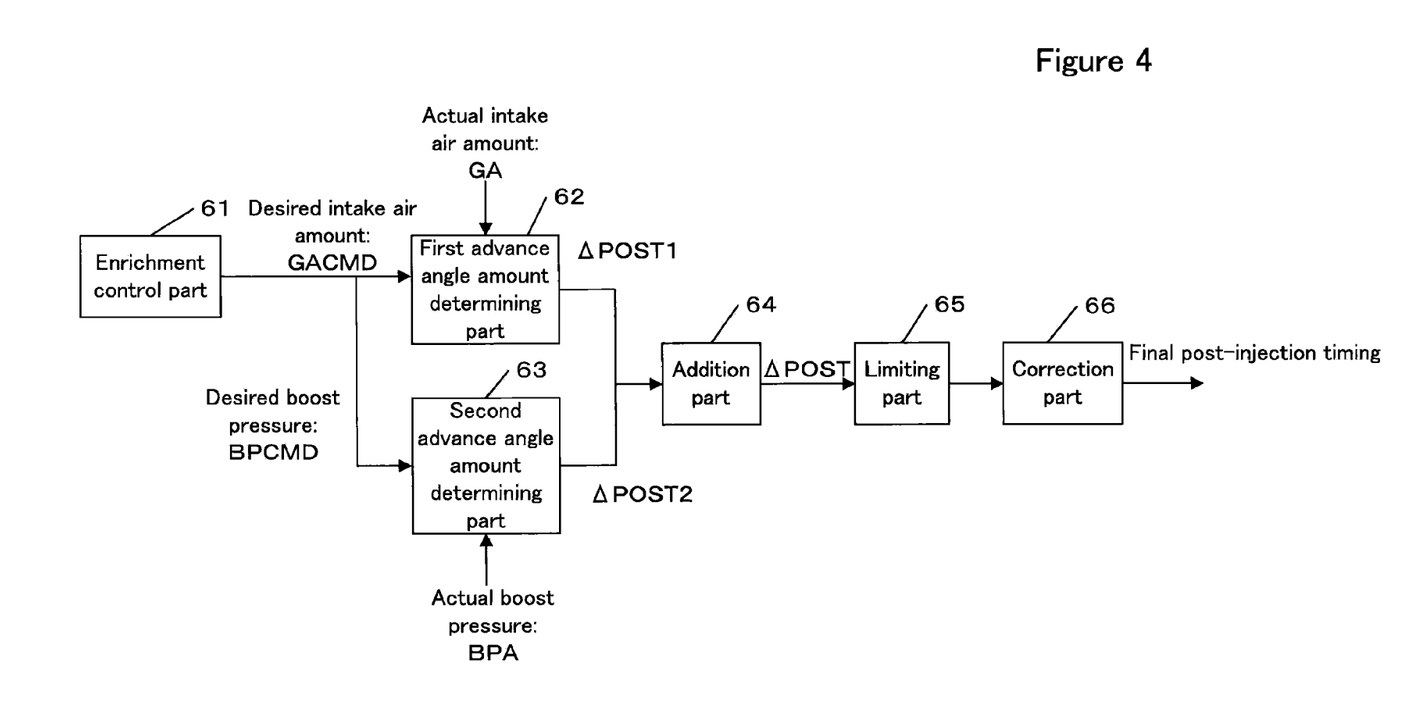
FIG. 4 is a block diagram of a control apparatus in accordance with one embodiment of the present invention.

FIG. 4 shows functional blocks of a control apparatus in accordance with one embodiment of the present invention. These functional blocks are implemented in the ECU 1.

An enrichment control part 61 starts an enrichment control that involves a post-injection in response to satisfaction of a predetermined condition so as to perform a process for reducing the NOx catalyst 42. The condition for performing this control is, for example, that an absorption amount of the NOx catalyst, which is estimated in accordance with any appropriate method (for example, refer to Japanese Patent Application Publication No. 2006-242170), is greater than a predetermined amount. Alternatively, the enrichment control may be started in a predetermined time interval or in a predetermined traveling distance of the vehicle.

If the enrichment control that involves the post-injection is permitted, the enrichment control part 61 refers to a predetermined map (not shown in the figure) based on the engine rotational speed NE and the accelerator opening degree AP (which represents a requested torque) to determine a desired throttle valve opening degree THCMD. This map is defined such that a desired throttle valve opening degree is smaller than an opening degree (for example, a full opening) at a normal operation of the engine when the air/fuel ratio is lean. The actuator 24 controls the opening degree of the throttle valve 23 in accordance with the desired throttle opening THCMD thus determined. Thus, the intake air amount that is taken into the engine 2 through the throttle valve 23 is decreased.

Further, the enrichment control part 61 refers to a predetermined map (not shown in the figure) based on the engine rotational speed NE and the accelerator opening degree AP (which represents a requested torque) to determine a desired boost pressure BPCMD. The actuator 17 controls the variable vanes 16 in accordance with the desired boost pressure BPCMD thus determined.

The enrichment control part 61 determines, through a predetermined feedback control for the EGR amount, a desired EGR gas amount EGRCMD for causing an actual intake air amount GA to converge to a desired intake air amount GACMD. The desired intake air amount GACMD is determined by referring to a predetermined map (not shown in the figure) based on the engine rotational speed NE and the accelerator opening degree AP. The EGR control valve 32 is driven in accordance with the desired EGR gas amount EGRCMD thus determined.

The enrichment control part 61 further refers to a predetermined map (not shown in the figure) based on the engine rotational speed NE and the accelerator opening degree AP to determine a desired fuel injection amount POSTCMD for the post-injection. In this map, a desired fuel injection amount POSTCMD for the post-injection is defined such that a combination of the desired fuel injection amount for the post-injection and a desired fuel injection amount for the main injection achieves a desired air/fuel ratio. Here, the desired air/fuel ratio is set to a value on the rich side with respect to the theoretical air/fuel ratio. Further, the enrichment control part 61 determines a basic post-injection timing POSTTIM for the post-injection by referring to a predetermined map (not shown in the figure) based on the engine rotational speed NE and the accelerator opening degree AP. This map is defined such that the basic post-injection timing POSTTIM is a timing value within the expansion stroke or the exhaust stroke.

A first advance angle amount determining part 62 determines a first advance angle amount ΔPOST1 corresponding to a difference between the actual and desired intake air amounts when the actual intake air amount GA is less than the desired intake air amount GACMD. The first advance angle amount ΔPOST1 is determined such that it is greater with an increase in the difference. Thus, the post-injection timing is more advanced as the shortage of the air amount is greater. As a result, the combustibility is improved and the HC exhaust amount is decreased.

A second advance angle amount determining part 63 determines a second advance angle amount ΔPOST2 corresponding to a difference between the actual and desired boost pressures when the actual boost pressure BPA is higher than the desired boost pressure BPCMD. The second advance angle amount ΔPOST2 is determined such that it is greater with an increase in the difference. Thus, the post-injection timing is more advanced as the shortage of the air amount is greater. As a result, the combustibility is improved and the HC exhaust amount is decreased.

An addition part 64 adds the first advance angle amount ΔPOST1 and the second advance angle amount ΔPOST2 to calculate a total advance angle amount ΔPOST as in the following equation:

$$\Delta POST = \Delta POST1 + \Delta POST2$$

A limiting part 65 applies a limiting process to the total advance angle amount ΔPOST by using a predetermined threshold value. As the advance angle amount for the post-injection timing increases, the HC exhaust amount decreases. However, it may cause more smoke because the combustion is more active. Therefore, it is preferable to limit the advance angle amount by the predetermined threshold value such that the amount of smoke does not exceed a predetermined allowable level. The threshold value can be pre-established through a simulation or the like.

In accordance with the total advance angle amount ΔPOST, a correction part 66 corrects the basic post-injection timing POSTTIM determined for the post-injection to determine a final post-injection timing FPOSTTIM. Thus, the post-injection by the fuel injection valve 8 is performed to inject the above-determined desired fuel injection amount POSTCMD in accordance with the final post-injection timing FPOSTTIM thus determined through the correction based on the shortage of the air amount.

In this embodiment, the final post-injection timing is determined based on the total advance angle amount calculated by adding the first advance angle amount and the second advance angle amount. As described above referring to FIG. 2, by using both the first and second advance angle amounts, an increase in the HC exhaust amount can be suppressed not only in the case where the actual intake amount undershoots the desired intake air amount but also in the case where the actual boost pressure overshoots the desired boost pressure by narrowing the opening of the throttle valve. Alternatively, one of the first and second advance angle amounts may be used to control the post-injection timing. In this alternative case, one of the first advance angle amount determining part 62 and the second advance angle amount determining part 63 is provided and the addition part 64 is not provided. The limiting part 65 applies the above-described limiting process to the first or second advance angle amount. The correction part 66 corrects the basic post-injection timing in accordance with the limited first or second advance angle amount to determine the final post-injection timing. One of the first advance angle amount and the second advance angle amount that is used to correct the basic post-injection timing may be selected in accordance with the operating condition of the engine 2.

Figure 5:
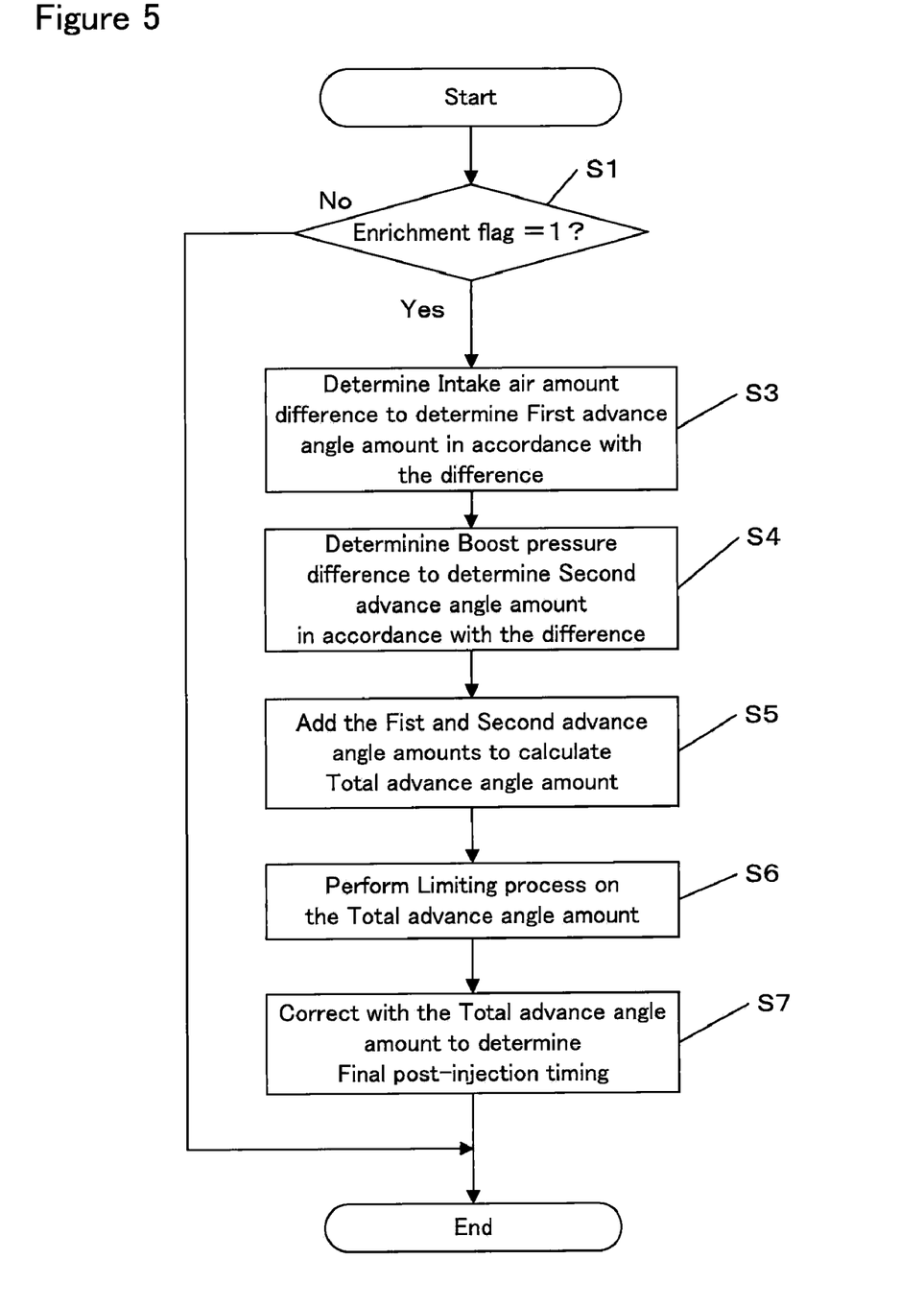
FIG. 5 is a flowchart of a control process in accordance with one embodiment of the present invention.

Referring to FIG. 5, a process for implementing a fuel control according to one embodiment of the invention will be described. In this example, the process is performed by the ECU1, more specifically, by the first advance angle amount determining part 62, the second advance angle amount determining part 63, the addition part 64, the limiting part 65 and the correction part 66 in FIG. 4. In this example, the process is performed in synchronization with an input of the TDC signal.

In step S1, an enrichment flag, which is to be set to a value of one when a predetermined condition for starting an enrichment control involving a post-injection is satisfied, is examined. If the decision in step S1 is "No", the process terminates here. If the decision in step S1 is "Yes", it indicates that the enrichment control involving the post-injection is being carried out. The process proceeds to step S3.

Step S3 is a process performed by the first advance angle amount determining part 62. According to the following equation, a difference ΔQair between the actual intake air amount GA that is detected by the air flow meter 20 and a desired intake air amount GACMD is calculated.

$$\Delta Q\text{air} = GACMD - GA$$

Figure 6:
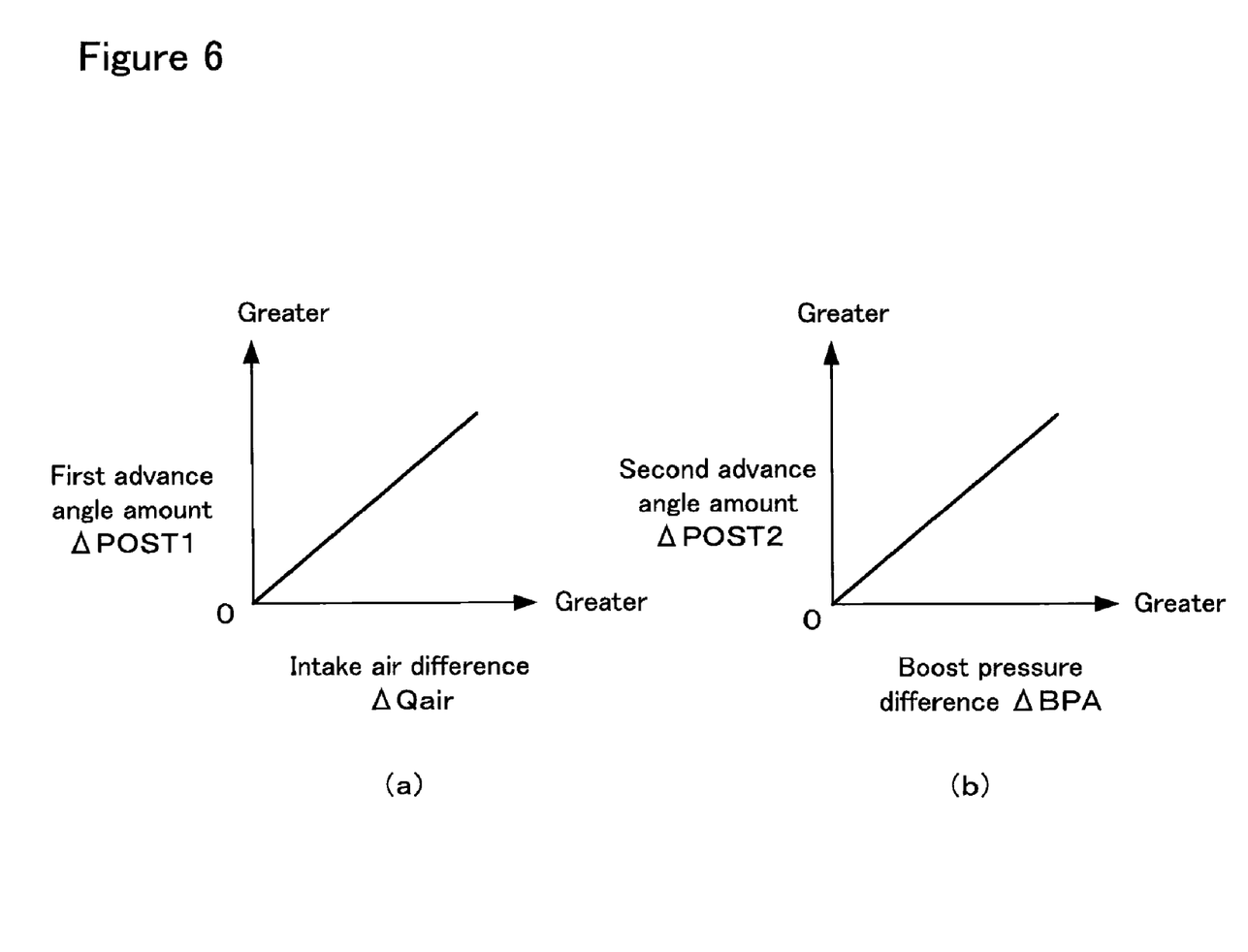
FIG. 6 shows maps for defining an advance angle amount based on an intake air amount difference and a boost pressure difference in accordance with one embodiment of the present invention.

A map as shown in FIG. 6(*a*) is referred to based on the intake air amount difference ΔQair to determine the first advance angle amount ΔPOST1 for the post-injection timing corresponding to the difference ΔQair. This map may be stored in the memory of the ECU 1. This map is defined such that the advance angle amount is greater as the intake air amount difference ΔQair is greater. In other words, this map is defined such that the advance angle amount is greater, as the shortage of the actual intake air amount with respect to the desired intake air amount, which is caused by decreasing the opening degree of the throttle valve, is greater. Thus, as the shortage of the intake air amount is greater, the advance angle amount is more increased so that the combustibility of the fuel is improved.

Step S4 is a process performed by the second advance angle amount determining part 62. According to the following equation, a difference ΔBPA between the actual boost pressure BPA that is detected by the boost pressure sensor 22 and a desired boost pressure BPCMD is calculated.

$$\Delta BPA = BPA - BPCMD$$

A map as shown in FIG. 6(b) is referred to based on the boost pressure difference ΔBPA to determine the second advance angle amount ΔPOST2 for the post-injection timing corresponding to the difference ΔBPA. This map may be stored in the memory of the ECU 1. This map is defined such that the advance angle amount is greater, as the boost pressure difference ΔBPA is greater. In other words, this map is defined such that the advance angle amount is greater, as the amount of new air that has been decreased by decreasing the opening degree of the throttle valve is greater. Thus, as the amount of a decrease in the new air is greater, the advance angle amount is more increased so that the combustibility of the fuel is improved.

Steps S3 and S4 may be performed in parallel or in inverse order. In step S5, the first advance angle amount ΔPOST1 and the second advance angle amount ΔPOST2 are added to determine the total advance angle amount ΔPOST as described above. In step S6, a limiting process using a predetermined threshold value is applied to the total advance angle amount ΔPOST. For example, assuming that the threshold value is set to a crank angle of "30" degrees, the total advance angle amount ΔPOST is set to this threshold value of "30" when the total advance angle amount is greater than "30".

In step S7, a final post-injection timing FPOSTTIM is calculated by subtracting the limited total advance angle amount ΔPOST from the basic post-injection timing POSTTIM as expressed in the following equation:

$$FPOSTTIM = POSTTIM - \Delta POST$$

Thus, the post-injection by the fuel injection valve 8 is carried out in accordance with the final post-injection timing FPOSTTIM.

Alternatively; a threshold value may be applied to the intake air amount difference ΔQair and the boost pressure difference ΔBPA. For example, the first advance angle amount may be determined when the intake air amount difference ΔQair is equal to or greater than a predetermined value. The second advance angle amount may be determined when the boost pressure difference ΔBPA is equal to or greater than a predetermined value.

Figure 7:
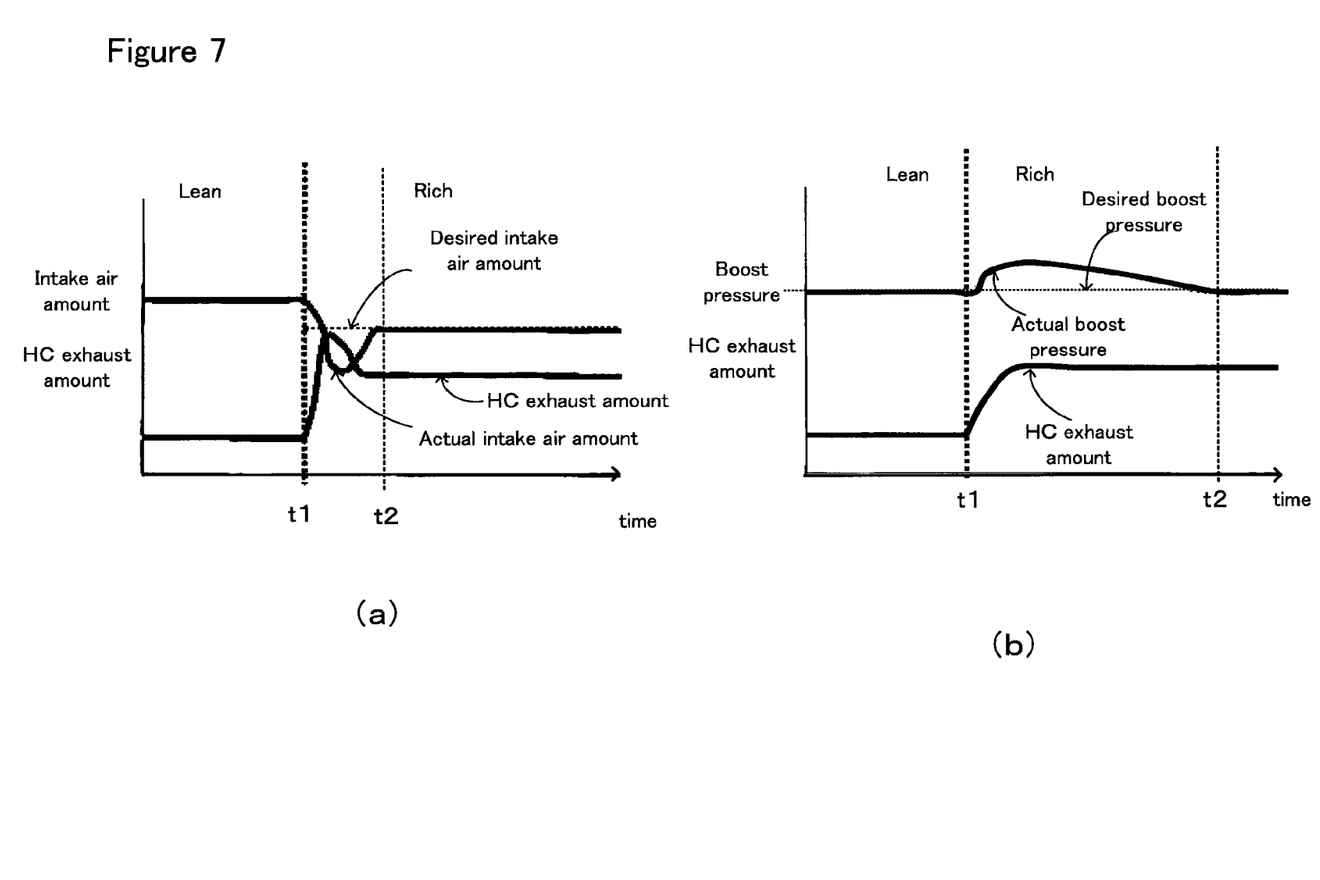
FIG. 7 shows an effect of a control in accordance with one embodiment of the present invention.

FIG. 7(a) shows an example of a simulation result regarding the actual intake air amount and the HC exhaust amount when the above-described technique in accordance with the present invention is applied. As clearly seen from a comparison with FIG. 2(a), even when the actual intake amount undershoots the desired intake air amount by decreasing the opening degree of the throttle valve in the enrichment control, an increase in the HC exhaust amount is suppressed because an occurrence of the unburned fuel is suppressed by advancing the post-injection timing. Further, FIG. 7(b) shows an example of a simulation result regarding the actual boost pressure and the HC exhaust amount when the above-described technique in accordance with the present invention is applied. As clearly seen from a comparison with FIG. 2(b), even when the actual boost pressure overshoots the desired boost pressure by decreasing the opening degree of the throttling valve in the enrichment control, an increase in the HC exhaust amount is suppressed because an occurrence of the unburned fuel is suppressed by advancing the post-injection timing.

Although the embodiments of the present invention have been described above with reference to a diesel engine as an example, the present invention can be applied to a gasoline engine or the like. Further, the present invention can be applied to a general-purpose internal-combustion engine (such as an outboard motor or the like).

What is claimed is:

1. A control apparatus of an internal-combustion engine having an exhaust gas purifying device that is disposed in an exhaust system of the engine, comprising:

reducing agent supplying means for supplying a reducing agent to the exhaust gas purifying device by injecting fuel in an expansion stroke or an exhaust stroke of the engine;

intake air amount controlling means that is disposed in an intake air system of the engine, the controlling means controlling an intake air amount supplied to the engine;

intake air amount decreasing means for decreasing the intake air amount supplied to the engine by the intake air amount controlling means during the fuel injection performed by the reducing agent supplying means; and injection timing correcting means for advancing an injection timing of the fuel injection performed by the reducing agent supplying means when an actual intake air amount is less than a desired intake air amount or when an actual boost pressure is higher than a desired boost pressure.

2. The control apparatus of claim 1, further comprising limiting means for setting a limit on an amount of the advancement of the injection timing determined by the injection timing correcting means.

3. The control apparatus of claim 1, wherein the injection timing correcting means determines an amount of the advancement of the injection timing of the fuel injection by adding an advance angle amount determined based on a difference between the actual intake air amount and the desired intake air amount and an advance angle amount determined based on a difference between the actual boost pressure and the desired boost pressure.

4. A method implemented for an internal-combustion engine, the engine having an exhaust gas purifying device that is disposed in an exhaust system of the engine, the engine being configured to supply a reducing agent to the exhaust gas purifying device by injecting fuel in an expansion stroke or an exhaust stroke of the engine, comprising the steps of:

decreasing an intake air amount supplied to the engine during the fuel injection for the supply of the reducing agent; and advancing an injection timing of the fuel injection for the supply of the reducing agent when an actual intake air amount is less than a desired intake air amount or when an actual boost pressure is higher than a desired boost pressure.

5. The method of claim 4, further comprising setting a limit on an amount of the advancement of the injection timing of the fuel injection for the supply of the reducing agent.

6. The method of claim 4, wherein the step of advancing further includes determining an amount of the advancement of the injection timing by adding an advance angle amount determined based on a difference between the actual intake air amount and the desired intake air amount and an advance angle amount determined based on a difference between the actual boost pressure and the desired boost pressure.

7. A computer readable medium storing a computer program for causing a computer to carry out a method for an engine, the engine having an exhaust gas purifying device that is disposed in an exhaust system of the engine, the engine being configured to supply a reducing agent to the exhaust gas purifying device by injecting fuel in an expansion stroke or an exhaust stroke of the engine, the method comprising the steps of:

decreasing an intake air amount supplied to the engine during the fuel injection for the supply of the reducing agent; and advancing an injection timing of the fuel injection for the supply of the reducing agent when an actual intake air amount is less than a desired intake air amount or when an actual boost pressure is higher than a desired boost pressure.

8. The computer readable medium of claim 7, wherein the method further comprises setting a limit on an amount of the advancement of the injection timing of the fuel injection for the supply of the reducing agent.

9. The computer readable medium of claim 7, wherein the step of advancing further includes determining an amount of the advancement of the injection timing by adding an advance angle amount determined based on a difference between the actual intake air amount and the desired intake air amount and an advance angle amount determined based on a difference between the actual boost pressure and the desired boost pressure.

* * * * *